Figure 1:
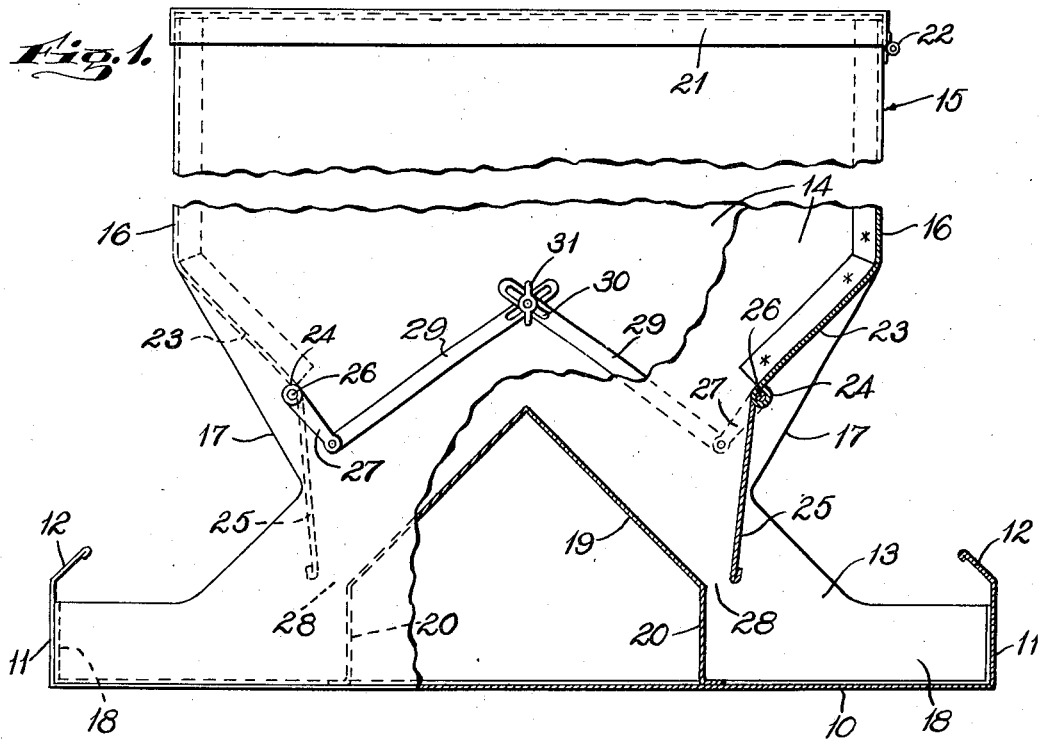

Sept. 5, 1939.   J. F. TRAPANI   2,171,998
POULTRY FEED DISPENSING DEVICE

Filed July 14, 1938

INVENTOR
JOSEPH F. TRAPANI
BY
ATTORNEY

Patented Sept. 5, 1939

2,171,998

UNITED STATES PATENT OFFICE 2,171,998

POULTRY FEED DISPENSING DEVICE

Joseph F. Trapani, Brooklyn, N. Y.

Application July 14, 1938, Serial No. 219,124

4 Claims. (Cl. 119—53)

This invention relates to the class of devices commonly termed feed trays or troughs in supporting the feed for poultry or various types and kinds of birds of this general type and kind, and more particularly to what I term a feed dispensing device; and the object of the invention is to provide a dispensing device of the type and kind under consideration employing a relatively large hopper or feed storage means whereby a large quantity of feed of the pulverized, granular or particle forms may be stored for automatic delivery to one or more feed troughs or trays of the device to provide and to insure the delivery of feed over a predetermined period of time sufficient to satisfy the wants and requirements of a predetermined number of birds or chicks, a further object being to provide a device of the character described having means for adjusting and regulating the discharge of feed from the storage chamber or hopper into the trough or tray to compensate for feed of different kinds and classes; and with these and other objects in view, the invention consists in a feed dispensing device which is simple and economical in construction, efficient in use, and which is constructed as hereinafter described and claimed.

Figure 2:
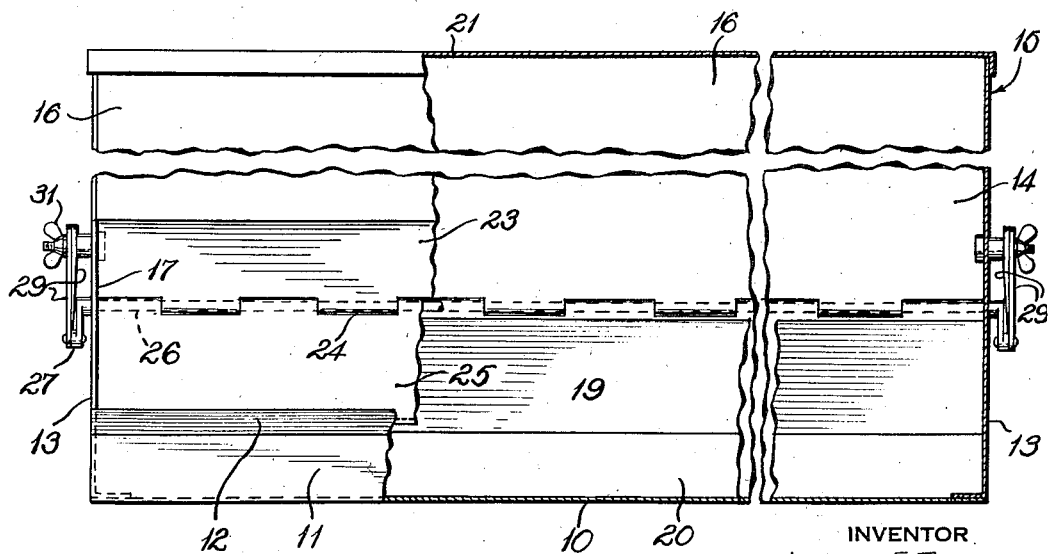

The invention is fully disclosed in the following specification, of which the accompanying drawing forms a part, in which the separate parts of my improvement are designated by suitable reference characters in each of the views, and in which:

Fig. 1 is a side and sectional view of a device made according to my invention with parts of the construction broken away; and, Fig. 2 is a side elevation with part of the construction shown in section and with parts broken away.

In the accompanying drawing parts of the structure are broken away and removed in both of the figures in order that the device may be illustrated on an enlarged scale. In the embodiment of the invention illustrated in these figures I have shown a bottom tray or pan portion 10 having raised side walls 11 having inturned flanges 12 and end walls 13 which project above the walls 11 and form at their upper ends, end walls 14 of a storage chamber or hopper 15. The hopper 15 is preferably oblong and rectangular in form; that is to say, there is a greater distance between the end walls 13 than between the side walls 16 of said hopper.

The lower portions of the end walls 14 are notched inwardly as seen at 17 in Fig. 1 of the drawing so as to give free access to the side tray or trough portions 18 of the device in order that the heads of chicks or other poultry or birds of other descriptions may readily enter the troughs or trays 18 to secure feed stored therein. The central portion of the device is supported longitudinally of the bottom wall 10 thereof, an upgitudinally extending wedge-shaped divider or partition 19 having downwardly extending side walls 20 which form the inner walls of the trays or troughs 18. The parts 19 and 20 extend the full length of the device and are attached to and serve to brace the end walls 13. The wedge-shaped partition or sub-divider 19 forms the bottom of the hopper and is intended to direct the feed to opposed sides of the device so as to extend into each of the feed receiving receptacles 18.

The hopper or storage chamber may be of a height to suit the requirements of the poultry man, and will be of such capacity as to store a sufficient amount of feed to satisfy the requirements of a predetermined number of birds over a period greater than twenty-four hours; or if desired, greater than two or three days as the case may be. It will be understood in this connection that an increased number of the complete devices may be used to satisfy the increased number of birds. The top of the hopper 15 is provided with a removable cover 21 which may be hinged at one side as seen at 22 so as to prevent the birds from obtaining access to the feed in the top of the hopper and to otherwise protect the feed in the device.

In some uses of the device, and where the feed control of a predetermined number of birds is regulated, and especially where the number of birds in a coop is definitely controlled, a device of this kind may be provided which includes inwardly inclined side walls 23 forming the bottom of the hopper. The lower ends of the side walls 23 would have a definite spaced relationship to the downwardly and laterally extending walls of the partition 19 to control the discharge of feed from the hopper into the receptacles 18. However, in more general uses of the device, it is desirable to provide adjustable means controlling these discharges not only from the standpoint of regulating the delivery of feed to some degree but also to compensate for different types and kinds of feed; that is to say, the finer grades and the coarser grades of feed, bearing in mind in this connection that gravel is oftentimes fed to poultry.

In the accompanying drawing I have shown a device constructed to accomplish the latter results, and in this connection, the walls 23 are made shorter and the lower ends are cut and curled to form parts of what is commonly termed a piano hinge 24; the other parts of the hinge being formed on adjustable plates 25. Pins 26 extend longitudinally through the hinges 24 and outwardly through the end walls 13, 14 of the device; the outer ends of the pins being bent to form adjacent one of the end walls, cranks 27. It will be understood that the hinge portions of the plates 25 are fixedly secured to the pins 26 whereas the pins freely rotate in the corresponding hinge portions of the walls 23. The walls 23 fit snugly within the walls 13, 14, whereas the plates 25 are free to move within said walls. These plates may be said to form elongated traps or doors movable with respect to the wedge-shaped partition or separator 19 to control the size of the discharge openings 28 into the receptacles 18.

To control the operation of the members 25, links 29 are pivoted to the cranks 27 and are provided at their upper ends with elongated slots 30 through which is passed a clamp screw 31 for adjustably clamping both links 29 together when the members 25 are adjusted in the desired positions. It will be understood that one member 25 may have an adjustment independent of the other as will be apparent. In the accompanying drawing, the members are shown in what might be termed a half open position which would be suitable for the medium type of feed, whereas when larger particles of feed are used a greater opening will be desirable, and when smaller feed is used, a smaller opening would suffice.

In the use of the device, it will be understood that the feed will collect in the receptacle or troughs 18 and will have a tendency to pile near the rear or inner ends of the receptacles adjacent openings 28, but as the feed is consumed, the same will automatically drop from the hopper through the openings 28 to replenish the supply.

It is another feature of the invention indicated in the particular arrangement of the hopper with respect to the feed troughs or receptacles to provide a relatively narrow opening between said hopper and the front and outer walls of the feed troughs. It will thus be seen that it will be impossible for birds to come in scratching contact with the feed as is common with other types of open trays or feed troughs, the heads only of the birds being admissible into the receptacles 18 for engagement with the feed. In this way, a considerable saving will be effected in the use of devices of this kind in eliminating the waste of feed occasioned by the use of the conventional type of trays or troughs.

In the accompanying drawing, the device is illustrated as being composed of sheet material with the several wall parts soldered, welded, or otherwise secured together, in accordance with conventional practices. However, it will be understood that the device may be produced in any desired manner and of any suitable materials, and various types and classes of controls may be provided regulating the discharge of feed from the hopper. It will also be apparent that the device may be made in different sizes. While a double trough or receptacle device is shown, it will also be apparent that devices may be constructed of single troughs which would represent simply one half of the complete device shown and modified in structure to suit such form as to adapt the same for use along a wall of a chicken-coop; whereas the present illustration is adapted for use in distributing the feed to at least two sides of the device. It is quite apparent, however, that by using a rectangular hopper or even a triangular hopper, delivery to a varied number of troughs will be provided. It will be understood that while the cranks 27 and links 29 are duplicated at both ends of the device, only a single series of these devices need be employed.

Having fully described my invention, what I claim as new and desire to secure by Letters Patent, is:

1. A poultry feed dispenser of the class described comprising a relatively large feed storage container and a feed tray arranged below and at one side of said container, said tray having a vertically disposed rear wall terminating at the upper edge thereof in an upwardly and inwardly inclined fixed guide plate forming a bottom wall portion for said container, a movable plate pivotally secured to said container at the lower end thereof, the lower edge of said plate being in substantial transverse alinement with the upper edge of said rear tray wall thereby providing an opening between said plates permitting free vertical delivery of feed to said tray, and said lower edge being movable transversely toward and from the upper edge of said rear tray wall to control said delivery.

2. A poultry feed dispenser of the class described comprising a relatively large feed storage container and a feed tray arranged below and at one side of said container, said tray having a vertically disposed rear wall terminating at the upper edge thereof in an upwardly and inwardly inclined fixed guide plate forming a bottom wall portion for said container, a movable plate pivotally secured to said container at the lower end thereof, said plate and container having pivot forming means comprising alternately spaced cylindrical bearing portions on the respective parts adapted to form a substantially continuous closed hinge extending throughout the length of said plate and container, the lower edge of said plate being in substantial alinement with the lower edge of said fixed guide plate forming a transverse opening therebetween, and said lower edge of the movable plate being adjustable toward and from said fixed guide plate for controlling the size of said opening and the corresponding delivery of feed therethrough.

3. A poultry feed dispenser of the class described comprising a relatively large feed storage container and a feed tray arranged below and at one side of said container, said tray having a vertically disposed rear wall terminating at the upper edge thereof in an upwardly and inwardly inclined fixed guide plate forming a bottom wall portion for said container, a movable plate pivotally secured to said container at the lower end thereof, the lower edge of said plate being in substantial transverse alinement with the upper edge of said rear tray wall thereby providing an opening between said plates permitting free vertical delivery of feed to said tray, means for moving said pivoted plate into different positions of adjustment to selectively regulate the size of said opening, and said means comprising an elongated rod secured to said plate at the pivot portion thereof and extending through the end wall of said container, a crank portion at one end of said rod, an elongated link coupled with said crank and manually adjustable clamping means on said container for controlling the effective length of said link.

4. In a poultry feed dispenser of the class described comprising a container having end walls extending to the bottom of said container and said walls terminating above the bottom thereof, a plurality of feed trays arranged below and protruding outwardly of the side walls of said container, said trays having inner vertically disposed wall portions joined at the upper edges thereof to upwardly and inwardly extending fixed guide means, the side walls of said container having movable guide plates pivotally secured to the lower edges thereof, the lower edge of each plate being in substantial alinement with the upper edge of the corresponding rear tray wall forming a feed discharge opening therebetween adapted for free vertical delivery of feed to said tray, and adjustable means coupled with each of said movable plates and cooperating with clamping means on said container for independently controlling the size of the respective discharge openings.

JOSEPH F. TRAPANI.